US008336398B2

(12) United States Patent
Shih (10) Patent No.: US 8,336,398 B2
(45) Date of Patent: Dec. 25, 2012

(54) PIPE CONNECTION HAVING A FLOW COUNTING FUNCTION

(76) Inventor: Pao-Yun Shih, Lugang Township, Changhua County (TW)

( * ) Notice: Subject to any disclaimer, the term of this patent is extended or adjusted under 35 U.S.C. 154(b) by 324 days.

(21) Appl. No.: 12/854,209

(22) Filed: Aug. 11, 2010

(65) Prior Publication Data

US 2012/0038143 A1   Feb. 16, 2012

(51) Int. Cl.
*G01F 1/05* (2006.01)
(52) U.S. Cl. .................................................. 73/861.79
(58) Field of Classification Search .................. None
See application file for complete search history.

(56) References Cited

U.S. PATENT DOCUMENTS

| | | | | |
|---|---|---|---|---|
| 4,346,705 A | * | 8/1982 | Pekkarinen et al. | 604/30 |
| 4,980,825 A | * | 12/1990 | Tootell et al. | 702/83 |
| 5,168,200 A | * | 12/1992 | Payne | 318/282 |
| 6,694,825 B2 | * | 2/2004 | Nimberger et al. | 73/861.77 |

* cited by examiner

*Primary Examiner* — Harshad R Patel
(74) *Attorney, Agent, or Firm* — Alan Kamrath; Kamrath IP Lawfirm, PA (57) ABSTRACT

A pipe connection includes a main body, an inner sleeve, a water inlet connector, a water outlet connector, a circuit board, a control panel, at least one battery, a magnetically activated detector, an impeller, and a magnetic member. In operation, when the water flows through the impeller, the impeller is rotated, and the magnetic member is moved to pass by the detector intermittently so that the detector can transmit a detected signal to the circuit board which can calculate the rotation speed of the magnetic member so as to obtain the water flow rate. Thus, the pipe connection can calculate and indicate the water flow rate in the pipe so that when the flow rate of the output water from the pipe reaches a preset value, the user can shut the water flow to regulate and save the water flow.

7 Claims, 10 Drawing Sheets

PIPE CONNECTION HAVING A FLOW COUNTING FUNCTION

BACKGROUND OF THE INVENTION

1. Field of the Invention

The present invention relates to a connecting device and, more particularly, to a pipe connection to connect two water pipes.

2. Description of the Related Art

A conventional pipe connection has a first end connected with a first pipe which is connected with a water source, such as a faucet and the like, and has a second end connected with a second pipe which is connected with a water outlet device, such as a sprinkler, sprayer and the like. Thus, water from the first pipe in turn flows through the pipe connection into the second pipe and is injected outward from the water outlet device for use with a user. However, the conventional pipe connection cannot calculate the water flow rate in the pipe so that the user cannot regulate water flow exactly, thereby easily consuming the water resource.

BRIEF SUMMARY OF THE INVENTION

In accordance with the present invention, there is provided a pipe connection, comprising a main body, an inner sleeve mounted in the main body and having a first end formed with a receiving chamber, a second end formed with a flow channel and a mediate portion provided with a separation wall connected between the receiving chamber and the flow channel, a water inlet connector mounted on a first end of the main body and connected to the receiving chamber of the inner sleeve, a water outlet connector mounted on a second end of the main body and connected to the flow channel of the inner sleeve, a circuit board mounted on the main body, a control panel mounted on the main body and aligning with the circuit board, at least one battery mounted on the main body and electrically connected with the circuit board by at least one electric wire to supply an electric power to the circuit board, a cover mounted on the main body to support the battery, a magnetically activated detector mounted on the separation wall of the inner sleeve and electrically connected with the circuit board to transmit a detected signal to the circuit board, an impeller rotatably mounted in the receiving chamber of the inner sleeve and disposed between the separation wall of the inner sleeve and the water inlet connector, and a magnetic member mounted on the impeller to rotate in concert with the impeller and movable to align with the detector.

The circuit board has a surface provided with a display and a control switch. The control panel has a surface provided with a window aligning with the display of the circuit board and a push button abutting the control switch of the circuit board. The separation wall of the inner sleeve has a periphery formed with a plurality of connecting holes connected between the receiving chamber and the flow channel and has a central portion formed with a shaft hole. The water inlet connector has an end portion having a periphery formed with a plurality of connecting bores and having a central portion formed with a shaft bore. The impeller has a periphery formed with a plurality of conducting holes connected between the connecting holes of the separation wall and the connecting bores of the water inlet connector. The impeller has a central portion provided with a rotation shaft having a first end rotatably mounted in the shaft hole of the separation wall and a second end rotatably mounted in the shaft bore of the water inlet connector.

The primary objective of the present invention is to provide a pipe connection having a flow counting function.

According to the primary advantage of the present invention, the pipe connection can calculate and indicate the water flow rate in the pipe so that when the flow rate of the output water from the pipe reaches a preset value, the user can shut the water flow to regulate the water flow so as to save the water resource.

According to another advantage of the present invention, the flow rate of the water is directly indicated on the display of the circuit board so that the user can regulate the water flow easily and quickly.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a pipe connection in accordance with the preferred embodiment of the present invention comprises a main body 10, an inner sleeve 11 mounted in the main body 10 and having a first end formed with a receiving chamber 12, a second end formed with a flow channel 13 and a mediate portion provided with a separation wall 111 connected between the receiving chamber 12 and the flow channel 13, a water inlet connector 30 mounted on a first end of the main body 10 and connected to the receiving chamber 12 of the inner sleeve 11, a water outlet connector 40 mounted on a second end of the main body 10 and connected to the flow channel 13 of the inner sleeve 11, a circuit board 23 mounted on the main body 10, a control panel 20 mounted on the main body 10 and aligning with the circuit board 23, at least one battery 151 mounted on the main body 10 and electrically connected with the circuit board 23 by at least one electric wire 152 to supply an electric power to the circuit board 23, a cover 16 mounted on the main body 10 to support the battery 151, a magnetically activated detector 112 mounted on the separation wall 111 of the inner sleeve 11 and electrically connected with the circuit board 23 to transmit a detected signal to the circuit board 23, an impeller 32 rotatably mounted in the receiving chamber 12 of the inner sleeve 11 and disposed between the separation wall 111 of the inner sleeve 11 and the water inlet connector 30, and a magnetic member 322 mounted on the impeller 32 to rotate in concert with the impeller 32 and movable to align with the detector 112.

The main body 10 has an open top side formed with a receiving space 14 to receive the circuit board 23 and an open bottom side formed with a receiving recess 15 to receive the battery 151.

The electric wire 152 extends from the receiving recess 15 of the main body 10 to the receiving space 14 of the main body 10.

The circuit board 23 is received in the receiving space 14 of the main body 10 and is located between the inner sleeve 11 and the control panel 20. The circuit board 23 has a surface provided with a display 231 and a control switch 232.

The control panel 20 is mounted on the open top side of the main body 10 and abuts the circuit board 23 to cover the circuit board 23 and the receiving space 14 of the main body 10. The control panel 20 has a surface provided with a window 12 aligning with the display 231 of the circuit board 23 and a push button 22 abutting the control switch 232 of the circuit board 23.

The cover 16 is mounted on the open bottom side of the main body 10 and abuts the battery 151 to cover the battery 151 and the receiving recess 15 of the main body 10.

The separation wall 111 of the inner sleeve 11 has a periphery formed with a plurality of connecting holes 114 connected between the receiving chamber 12 and the flow channel 13 and has a central portion formed with a shaft hole 113. The second end of the inner sleeve 11 is provided with a protruding mounting portion 131 connected to the flow channel 13.

The water outlet connector 40 is mounted on the mounting portion 131 of the inner sleeve 11.

The water inlet connector 30 is partially received in the receiving chamber 12 of the inner sleeve 11 and has an end portion having a periphery formed with a plurality of connecting bores 311 and having a central portion formed with a shaft bore 31. The water inlet connector 30 has a peripheral wall provided with a locking portion 33. In the preferred embodiment of the present invention, the locking portion 33 of the water inlet connector 30 is an outer thread.

The impeller 32 has a periphery formed with a plurality of conducting holes 320 connected between the connecting holes 114 of the separation wall 111 and the connecting bores 311 of the water inlet connector 30. The impeller 32 has a central portion provided with a rotation shaft 321 having a first end rotatably mounted in the shaft hole 113 of the separation wall 111 and a second end rotatably mounted in the shaft bore 31 of the water inlet connector 30. In the preferred embodiment of the present invention, the detector 112 is a reed switch, and the magnetic member 322 is a magnet.

Figure 1:
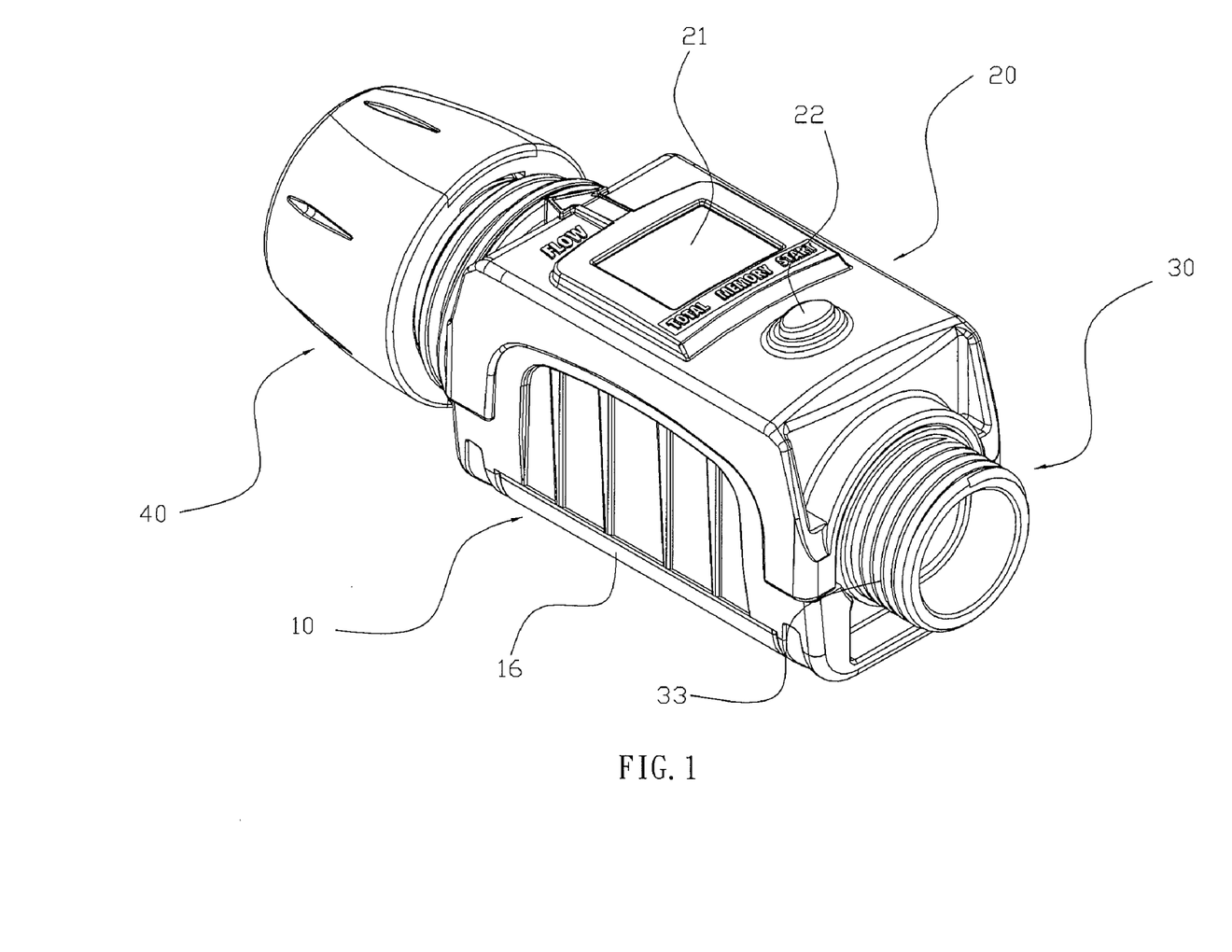
FIG. 1 is a perspective view of a pipe connection in accordance with the preferred embodiment of the present invention.
Figure 2:
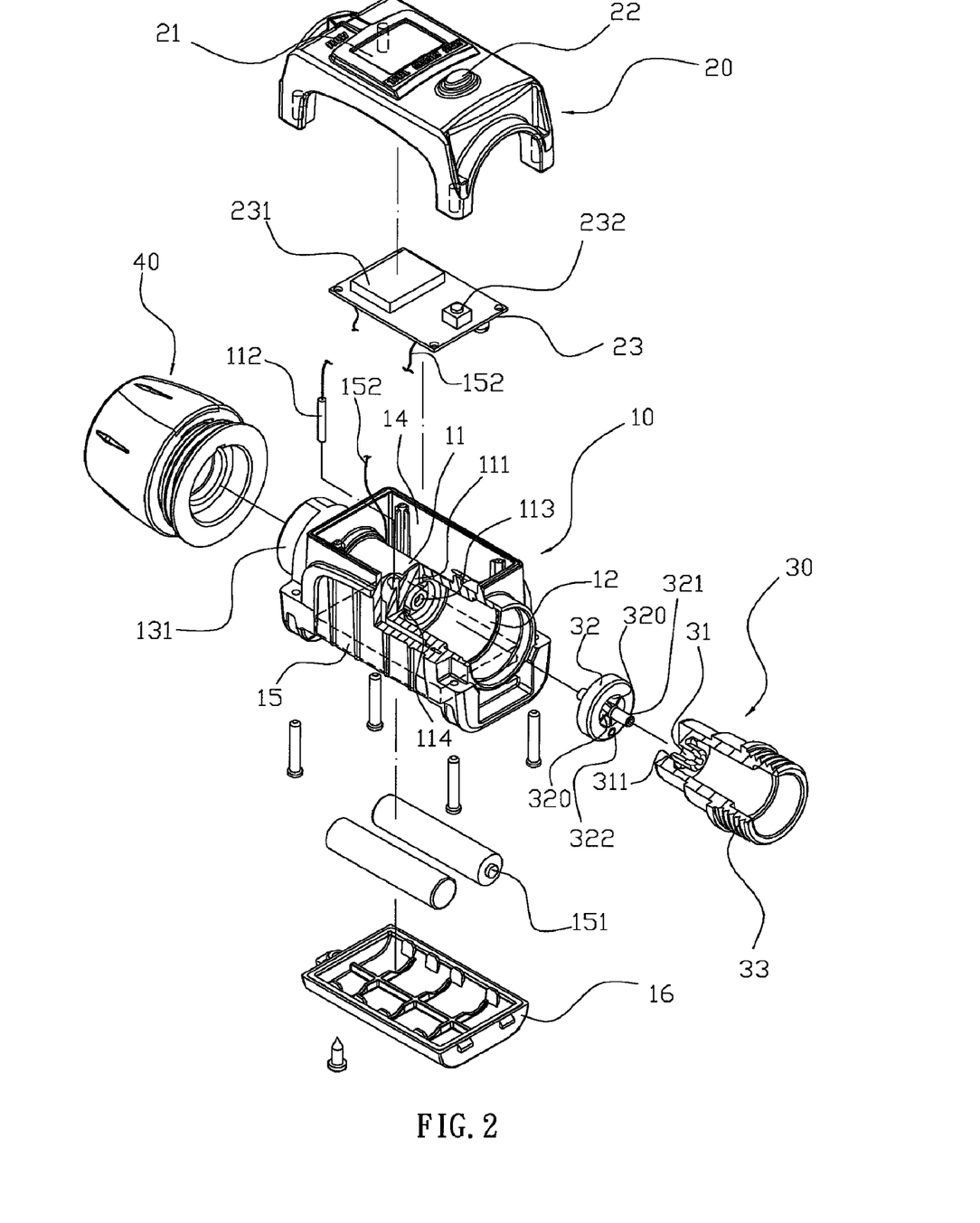
FIG. 2 is an exploded perspective view of the pipe connection as shown in FIG. 1.
Figure 3:
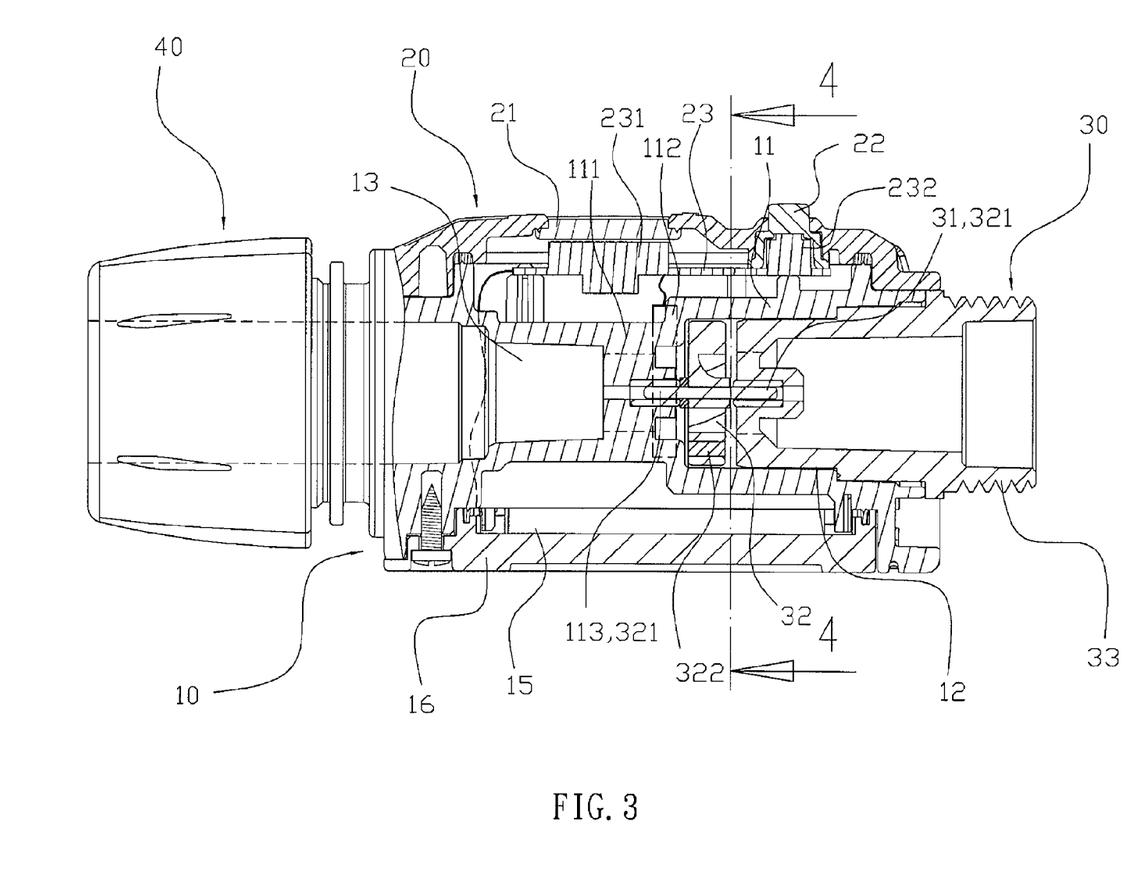
FIG. 3 is a front cross-sectional view of the pipe connection as shown in FIG. 1.
Figure 4:
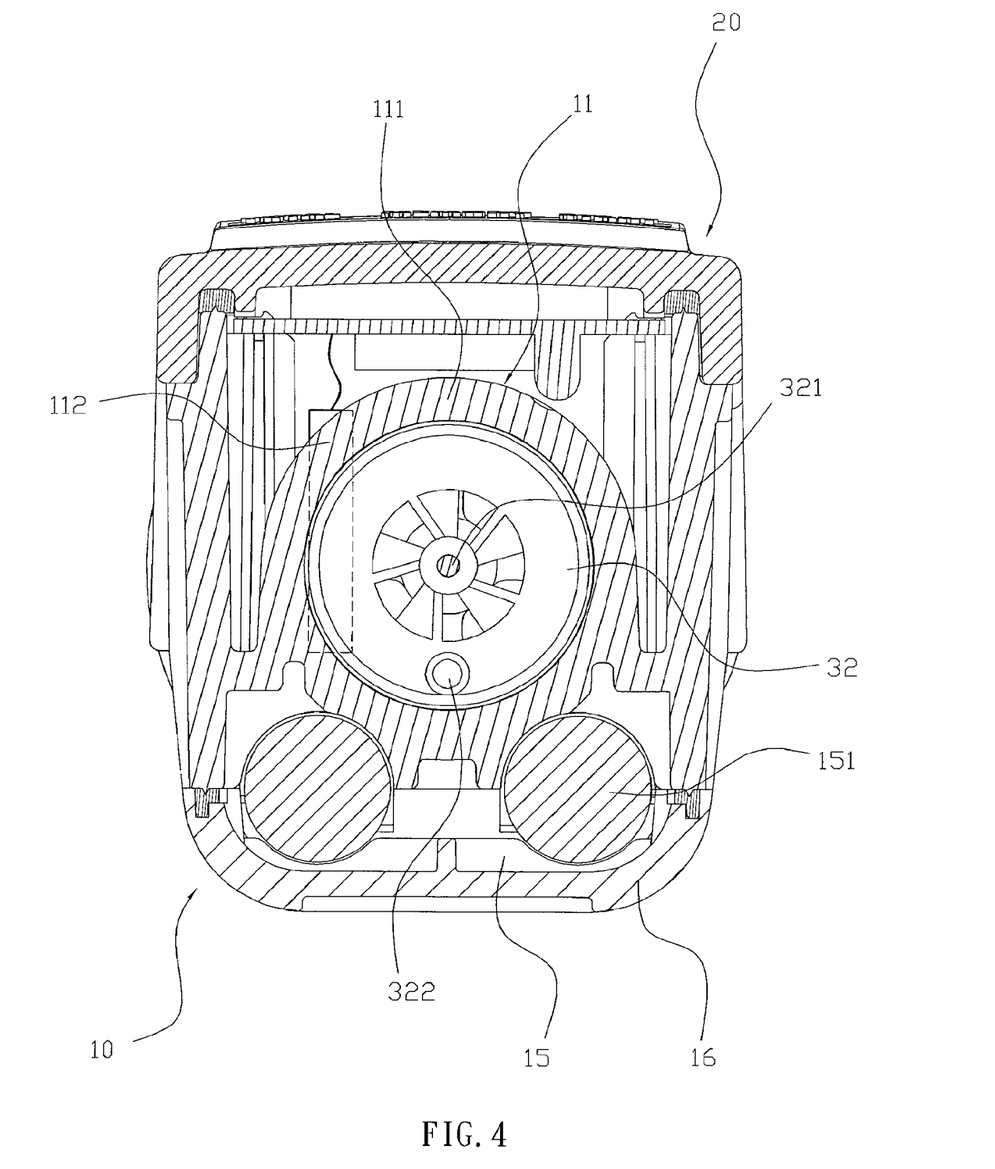
FIG. 4 is a side cross-sectional view of the pipe connection taken along line 4-4 as shown in FIG. 3.
Figure 5:
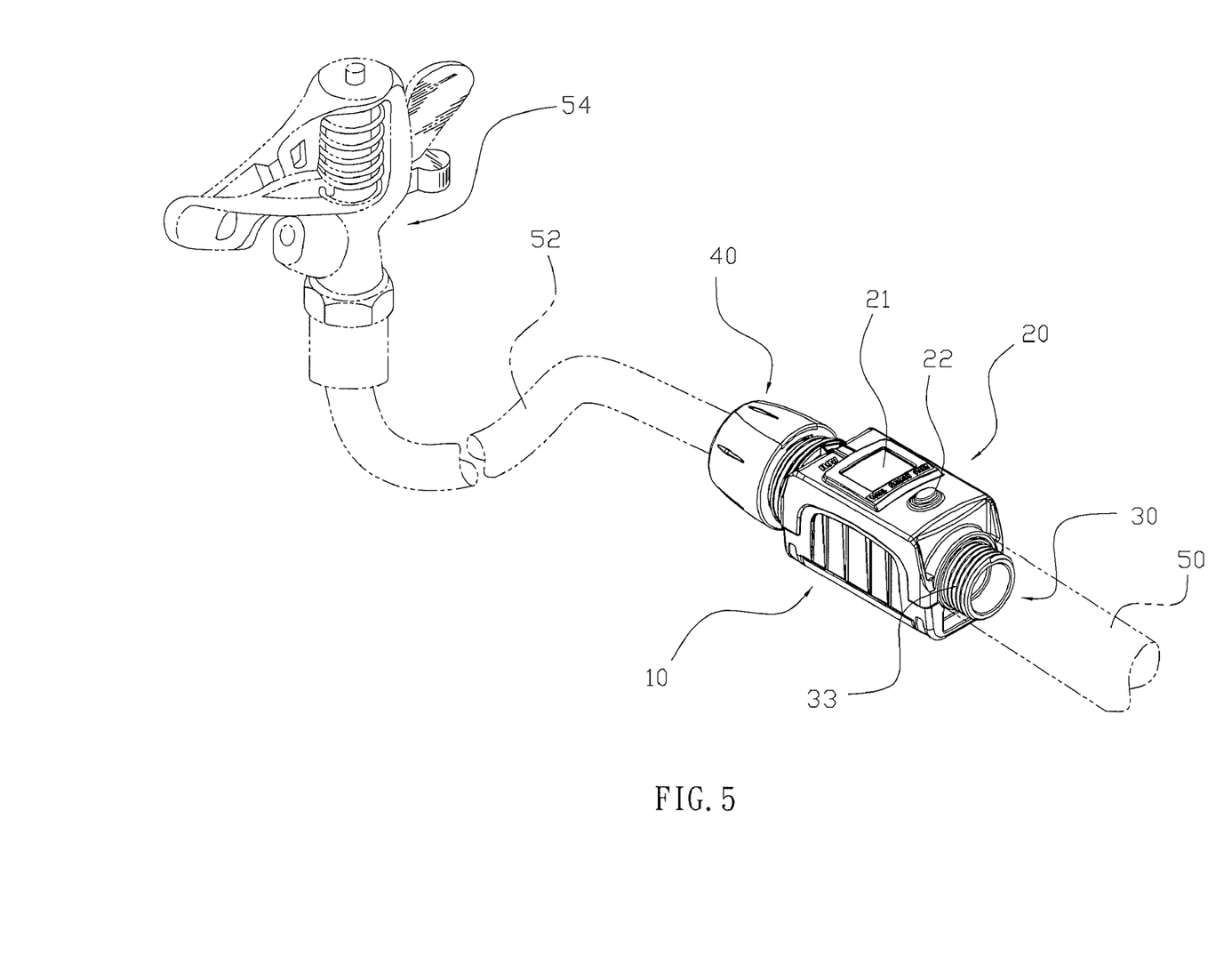
FIG. 5 is a schematic operational view of the pipe connection as shown in FIG. 1 in use.
Figure 6:
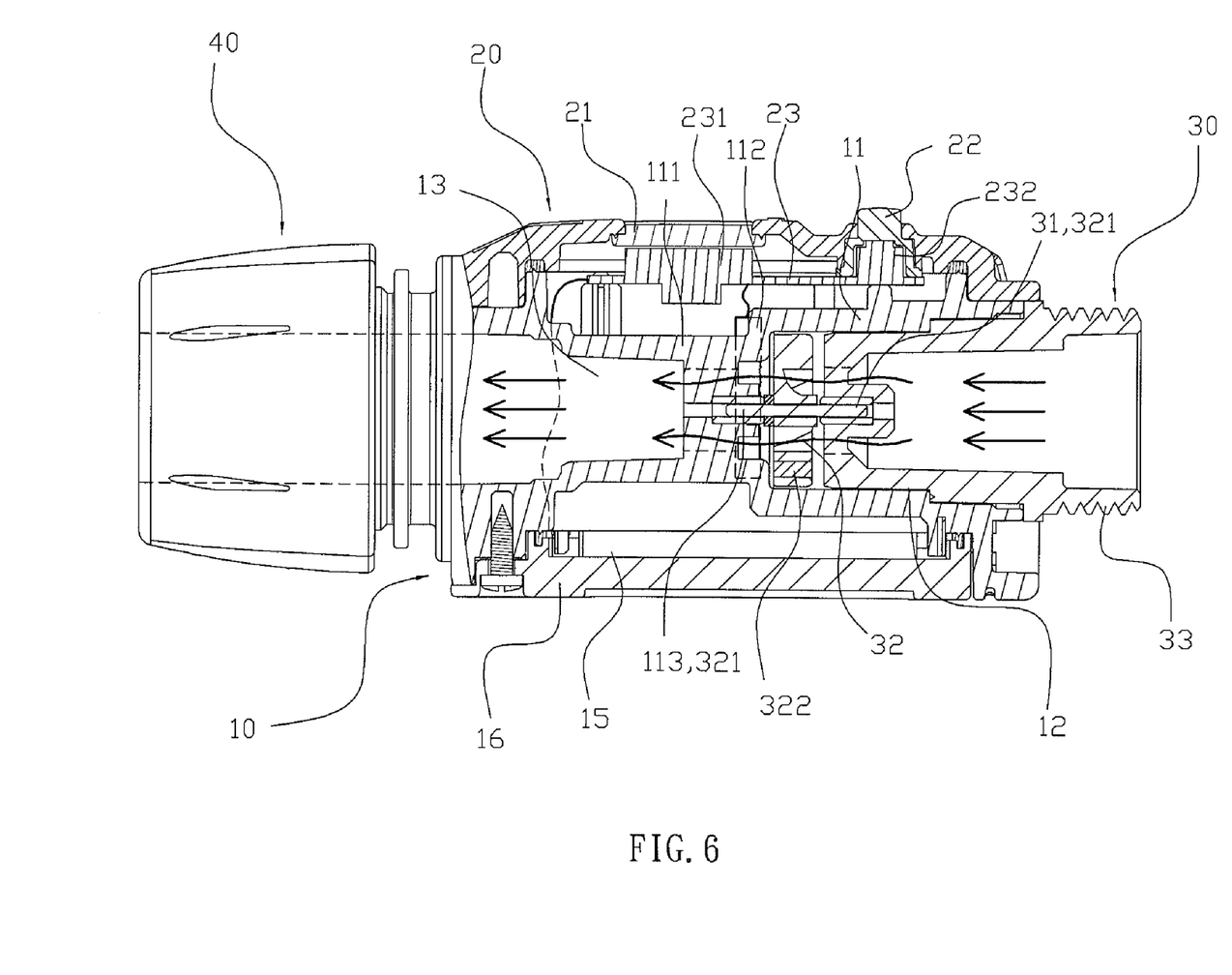
FIG. 6 is an operational view of the pipe connection as shown in FIG. 3.
Figure 7:
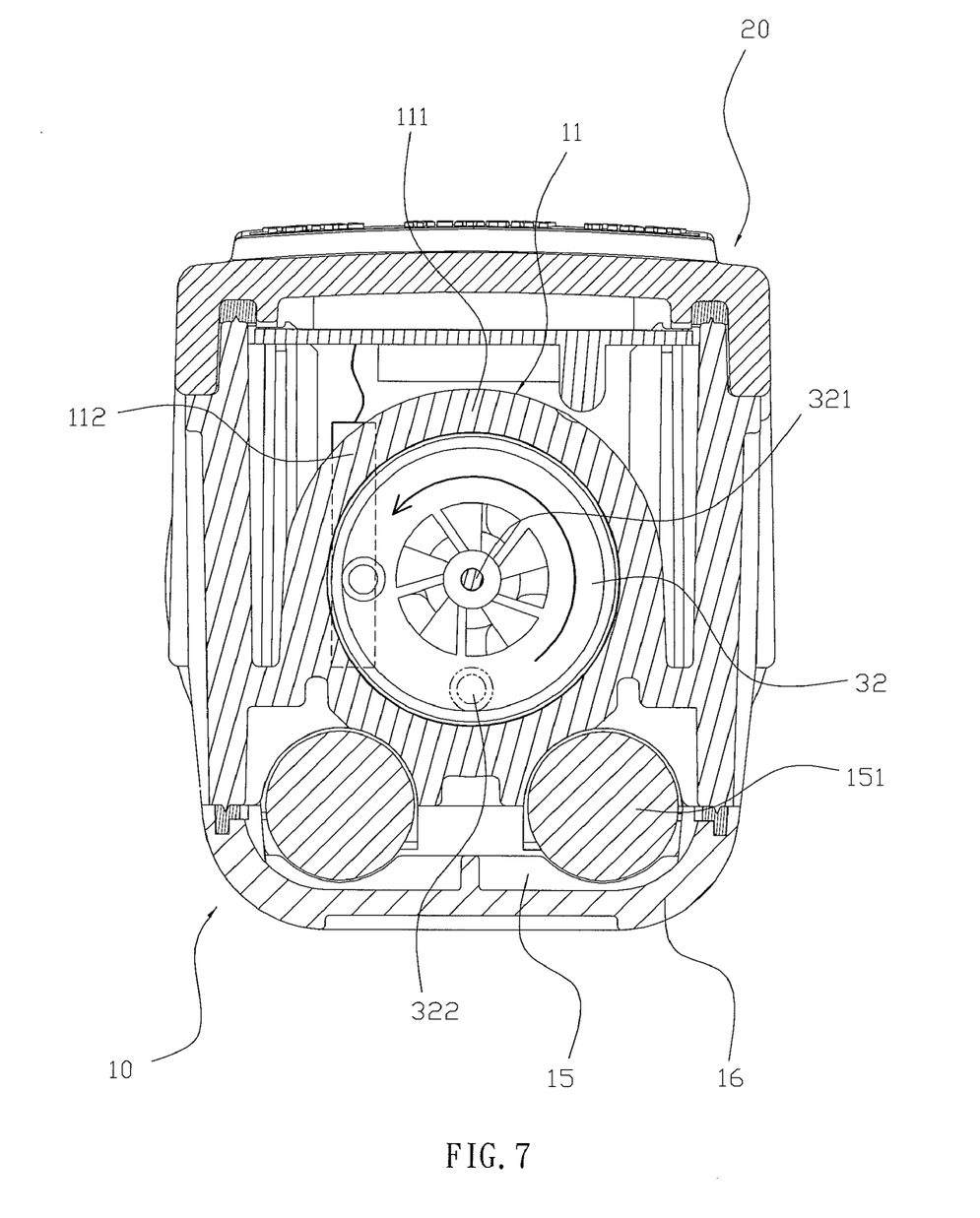
FIG. 7 is an operational view of the pipe connection as shown in FIG. 4.

In operation, referring to FIGS. 5-7 with reference to FIGS. 1-4, the water inlet connector 30 is connected with a first pipe 50 which is connected with a water source, such as a faucet and the like, and the water outlet connector 40 is connected with a second pipe 52 which is connected with a water outlet device 54, such as a sprinkler, sprayer and the like. Thus, water from the first pipe 50 in turn flows through the water inlet connector 30, the connecting bores 311 of the water inlet connector 30, the conducting holes 320 of the impeller 32, the connecting holes 114 of the separation wall 111, the flow channel 13 of the inner sleeve 11 and the water outlet connector 40 into the second pipe 52 and is injected outward from the water outlet device 54 for use with a user. In such a manner, when the water flows through the conducting holes 320 of the impeller 32, the impeller 32 is impacted and rotated, and the magnetic member 322 is moved to pass by the detector 112 intermittently to produce a magnetic interaction between the magnetic member 322 and the detector 112, so that the detector 112 can detect the number of rotation of the magnetic member 322 and can transmit a detected signal to the circuit board 23 which can calculate the rotation speed of the magnetic member 322 so as to obtain the flow rate of the water. At this time, the flow rate of the water is indicated on the display 231 of the circuit board 23 so that the user can know the flow rate of the output water so as to regulate the water flow.

Figure 8:
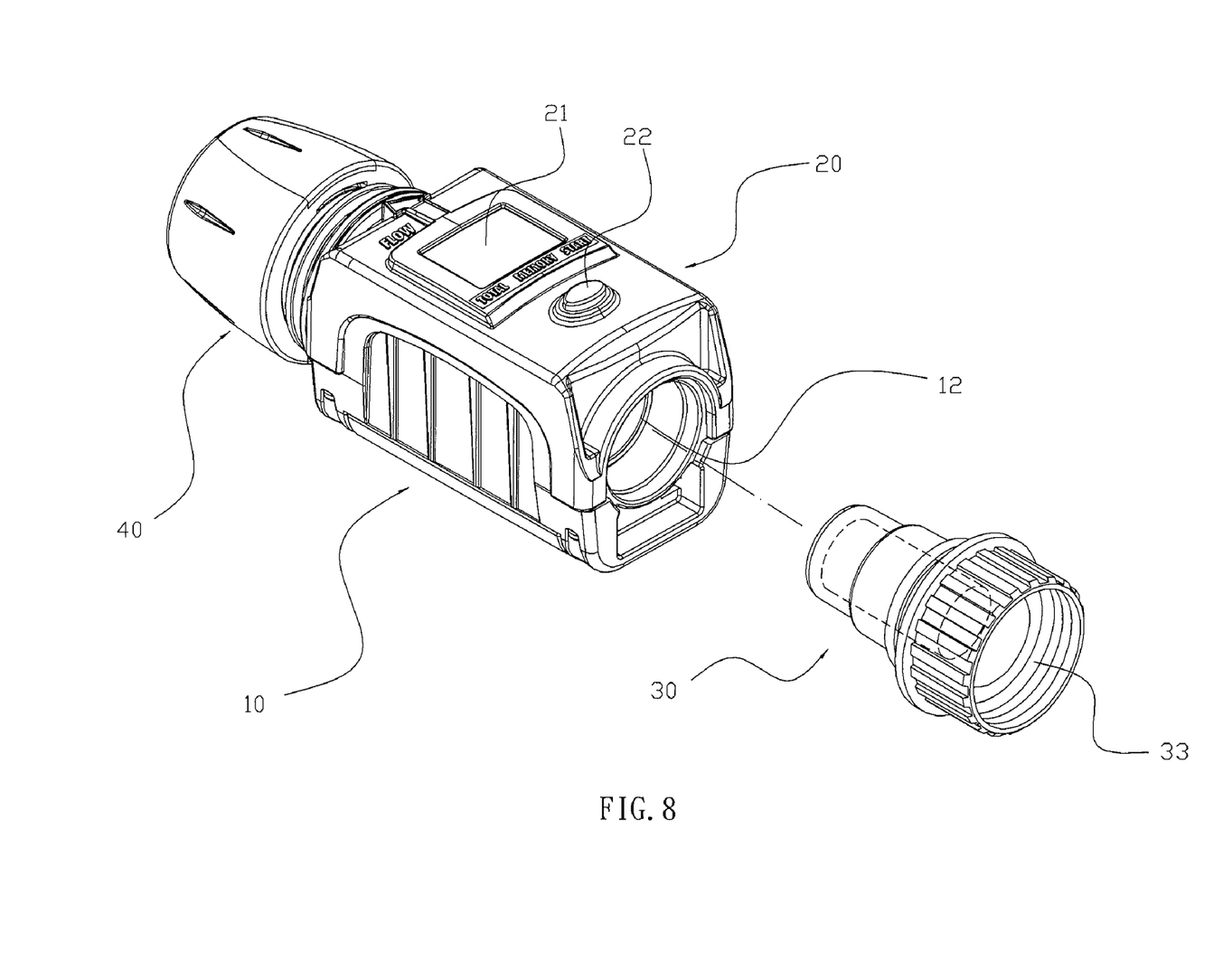
FIG. 8 is a partially exploded perspective view of a pipe connection in accordance with another preferred embodiment of the present invention.

As shown in FIG. 8, the locking portion 33 of the water inlet connector 30 is an inner thread.

Figure 9:
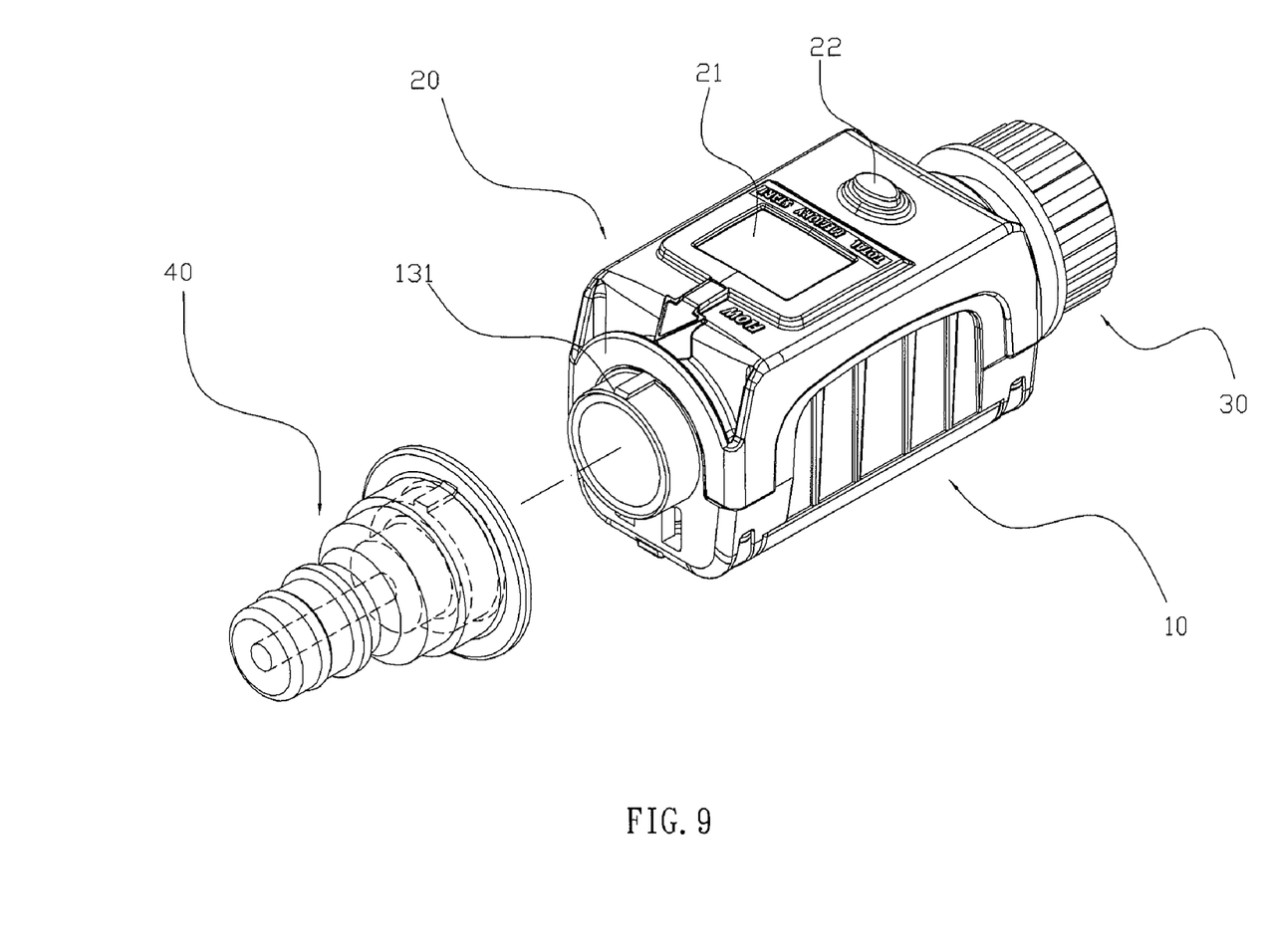
FIG. 9 is a partially exploded perspective view of a pipe connection in accordance with another preferred embodiment of the present invention.

As shown in FIG. 9, the water outlet connector 40 is a quick connector.

Figure 10:
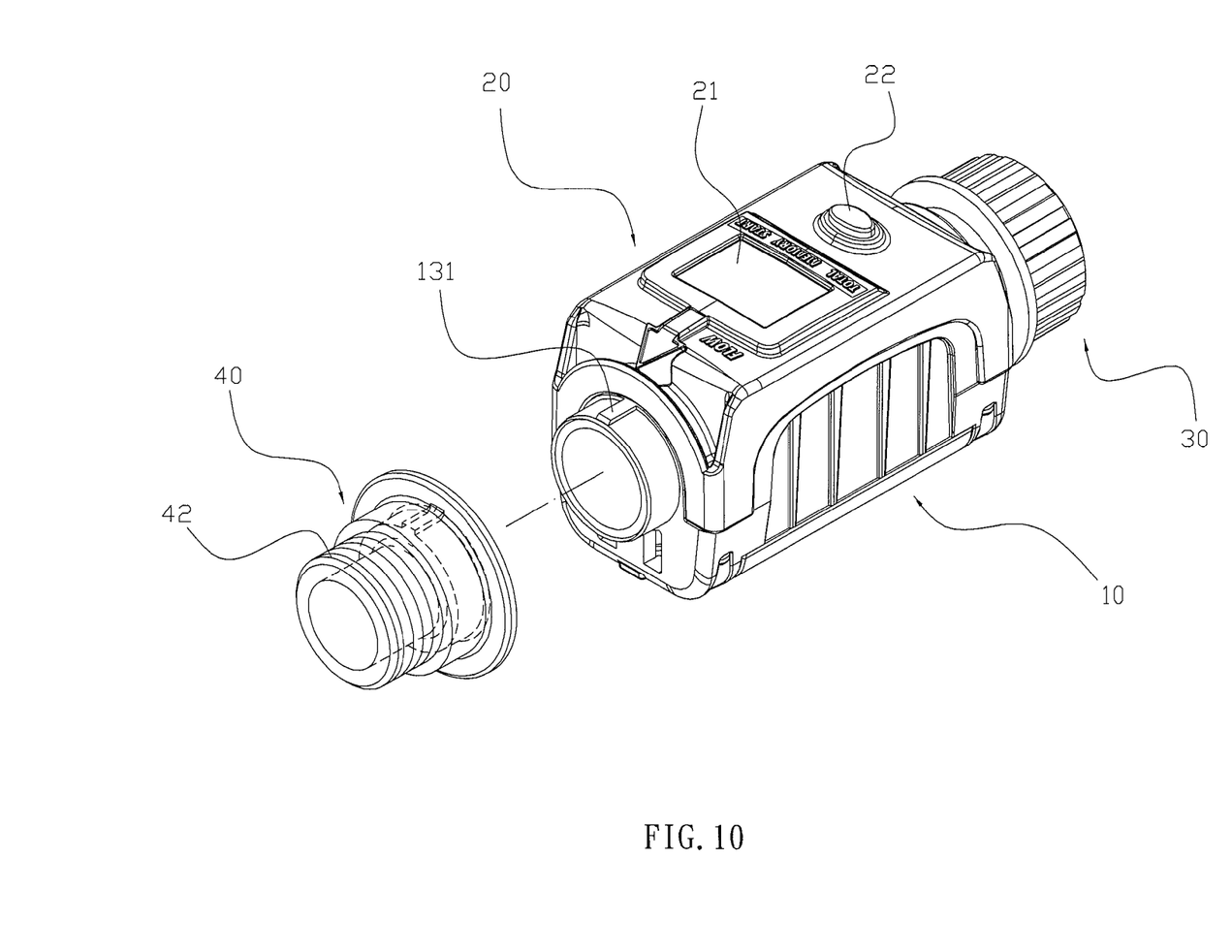
FIG. 10 is a partially exploded perspective view of a pipe connection in accordance with another preferred embodiment of the present invention.

As shown in FIG. 10, the water outlet connector 40 has an outer periphery provided with an outer thread 42.

Accordingly, the pipe connection can calculate and indicate the water flow rate in the pipe so that when the flow rate of the output water from the pipe reaches a preset value, the user can shut the water flow to regulate the water flow so as to save the water resource. In addition, the flow rate of the water is directly indicated on the display 231 of the circuit board 23 so that the user can regulate the water flow easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A flow monitoring pipe connection, comprising:
a main body;
an inner sleeve mounted in the main body and having a first end formed with a receiving chamber, a second end formed with a flow channel and a mediate portion provided with a separation wall connected between the receiving chamber and the flow channel;
a water inlet connector mounted on a first end of the main body and connected to the receiving chamber of the inner sleeve;
a water outlet connector mounted on a second end of the main body and connected to the flow channel of the inner sleeve;
a circuit board mounted on the main body;
a control panel mounted on the main body and aligning with the circuit board;
at least one battery mounted on the main body and electrically connected with the circuit board by at least one electric wire to supply an electric power to the circuit board;
a cover mounted on the main body to support the battery;
a magnetically activated detector mounted on the separation wall of the inner sleeve and electrically connected with the circuit board to transmit a detected signal to the circuit board;
an impeller rotatably mounted in the receiving chamber of the inner sleeve and disposed between the separation wall of the inner sleeve and the water inlet connector; and a magnetic member mounted on the impeller to rotate in concert with the impeller and movable to align with the detector;

wherein the circuit board has a surface provided with a display and a control switch;

the control panel has a surface provided with a window aligning with the display of the circuit board and a push button abutting the control switch of the circuit board;

the separation wall of the inner sleeve has a periphery formed with a plurality of connecting holes connected between the receiving chamber and the flow channel and has a central portion formed with a shaft hole;

the water inlet connector has an end portion having a periphery formed with a plurality of connecting bores and having a central portion formed with a shaft bore;

the impeller has a periphery formed with a plurality of conducting holes connected between the connecting holes of the separation wall and the connecting bores of the water inlet connector;

the impeller has a central portion provided with a rotation shaft having a first end rotatably mounted in the shaft hole of the separation wall and a second end rotatably mounted in the shaft bore of the water inlet connector.

2. The flow monitoring pipe connection of claim 1, wherein the main body has an open top side formed with a receiving space to receive the circuit board and an open bottom side formed with a receiving recess to receive the battery;

the electric wire extends from the receiving recess of the main body to the receiving space of the main body;

the circuit board is received in the receiving space of the main body and is located between the inner sleeve and the control panel;

the control panel is mounted on the open top side of the main body and abuts the circuit board to cover the circuit board and the receiving space of the main body;

the cover is mounted on the open bottom side of the main body and abuts the battery to cover the battery and the receiving recess of the main body.

3. The flow monitoring pipe connection of claim 1, wherein the second end of the inner sleeve is provided with a protruding mounting portion connected to the flow channel;

the water outlet connector is mounted on the mounting portion of the inner sleeve;

the water inlet connector is partially received in the receiving chamber of the inner sleeve.

4. The flow monitoring pipe connection of claim 1, wherein the detector is a reed switch;

the magnetic member is a magnet.

5. The flow monitoring pipe connection of claim 1, wherein the water inlet connector has a peripheral wall provided with a locking portion;

the locking portion of the water inlet connector is an outer thread or an inner thread.

6. The flow monitoring pipe connection of claim 1, wherein the water outlet connector is a quick connector.

7. The flow monitoring pipe connection of claim 1, wherein the water outlet connector has an outer periphery provided with an outer thread.

* * * * *